Sept. 7, 1965 J. R. OWERKO 3,205,409

ELECTRONIC DEVICE

Filed Feb. 18, 1963

Inventor:
John R. Owerko
By: Stone, Nieman, Burmeister & Zummer
Attorneys

United States Patent Office 3,205,409

Patented Sept. 7, 1965

3,205,409

ELECTRONIC DEVICE

John R. Owerko, Oak Park, Ill., assignor to A.R.F. Products, Inc., River Forest, Ill., a corporation of Illinois Filed Feb. 18, 1963, Ser. No. 259,164
4 Claims. (Cl. 317—112)

The present invention relates to small portable electronic devices and more particularly to the construction and assembly of such devices in closed carrying cases.

The present invention is particularly applicable for use in the construction of the carrying case for a small portable transmitter in which the entire case must be permeable to radio frequency waves. Such transmitters have found considerable use in the remote control of mechanisms such as garage doors. In controlling garage doors, radio frequency signals are generated by the transmitter and directed to a receiver which then actuates the necessary controllers to perform the required mechanical function, such as opening or closing the door. The transmitter is held by the user and actuated for the generation of a signal and when not in use the transmitter may be kept in the user's auto.

Remote control transmitters of the type in question are shown in U.S. Patent No. 2,695,951, issued November 30, 1954, to J. J. Hupert et al., and Patent No. 3,001,066, issued September 19,1961, to J. S. Naber et al. In these patents, oscillations are produced by the use of vacuum tube circuits or shock excitation circuits. It is well known that devices using such circuits may readily be adapted for semi-conductors and other miniature circuit components which in turn lend themselves to the use of printed circuit mounting and wiring. Such components usually have small power requirements which may be supplied by small capacity batteries or mechanical devices allowing the devices to be freely portable. These devices using printed circuit boards, components and small batteries may be housed in carrying cases which may measure about five inches by three inches by one inch, for example. Such cases must be permeable to radio frequency signals, must allow the device activating switch to be operated from the exterior of the case and must allow the case to be opened as required for changing batteries and servicing the device. In addition, the switch actuator which is external of the case must be protected from inadvertent actuations.

Remote control transmitters employing cases which are permeable by radio waves have been known prior to the present invention and such devices have employed a switch mechanism actuatable from exterior of the casing. Some such prior devices mount the electronic components of the device directly on the casing, and these components may not be removed from the casing for servicing without performing a major reconstruction of the unit. In devices of this type, a removable cover is provided for replacement of batteries. For those prior devices which utilize constructions in which the electronic components are mounted on a base separate from the casing and may be removed from the casing for servicing, the switch mechanism has been sealed against infiltration of dirt and grime by one mechanism and a separate closure mechanism is utilized with a movable portion of the casing which permits removal of the electronic unit from within the casing.

It is an object of the present invention to provide an electronic device having a switch mechanism disposed within a casing in which the switch mechanism extends through an aperture in the casing and the casing is sealed against infiltration of dirt, dust or particles by this same mechanism which locks a cover of the casing which provides ingress and egress of the electronic device.

It is a further object of the present invention to provide an electronic device having a switch and a casing including an aperture for the switch to permit the switch to be actuated from exterior of the casing, which is inexpensive in construction both from point of view of materials and assembly labor, and is more convenient than prior art devices for the removal of the electronic device from the casing.

The present invention further utilizes the switch housing as the means for mounting the printed board bearing the transmitter components on the case in a manner which protects the switch from inadvertent operations, and which uses the switch protector as the means for holding a case outer flap in the closed position locking the entire transmitter assembly within the carrying case.

The invention both as, to its organization and principle of operation together with further objects, features and advantages of the invention will best be understood by reference to the following specification taken in connection with the accompanying drawings, in which.

Figure 1:
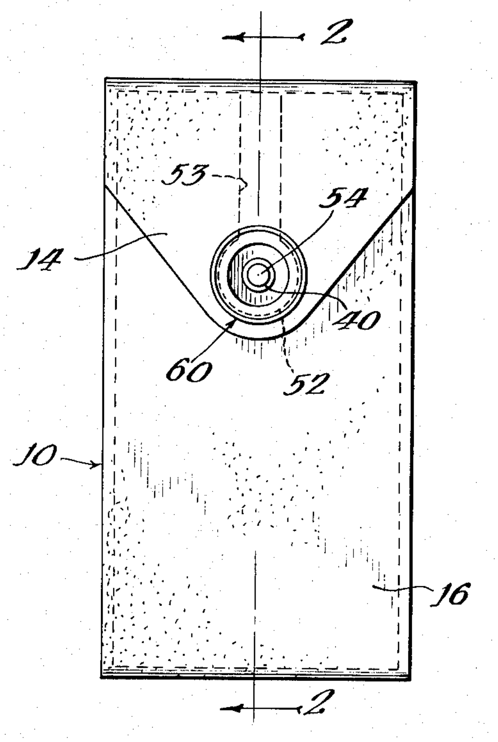
FIGURE 1 is a front view in elevation of the exterior of an electronic device utilizing the present invention.
Figure 2:
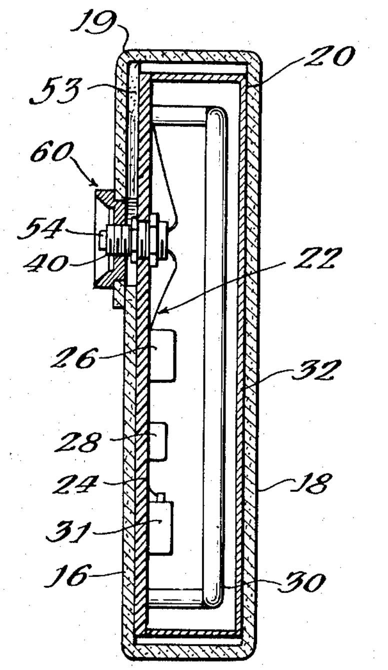
FIGURE 2 is a sectional view taken along line 2—2 of FIGURE 1.
Figures 3, 4:
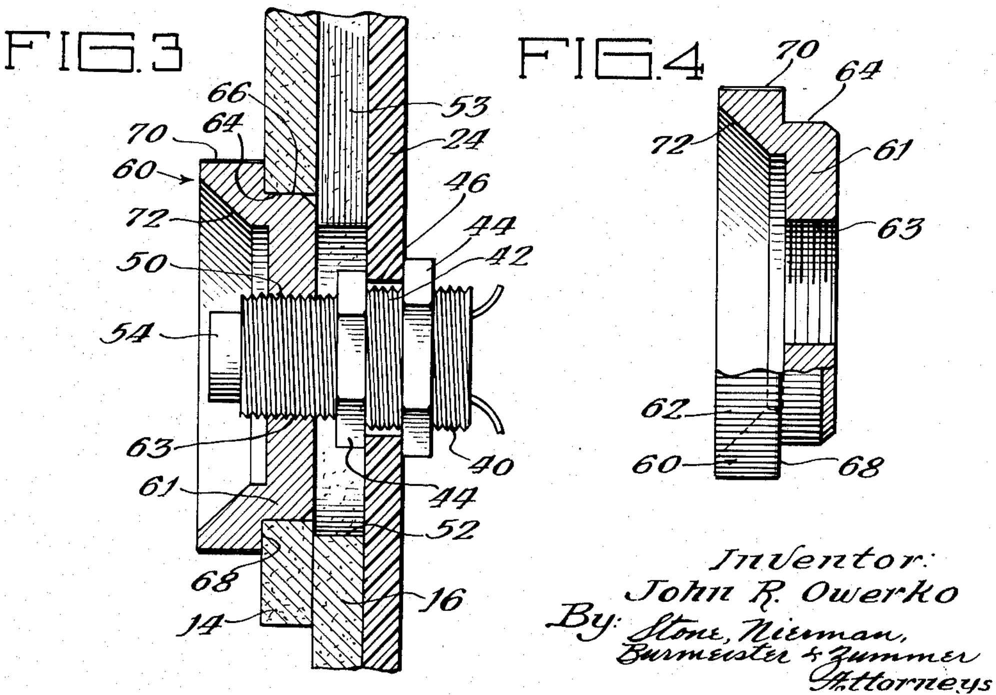
FIGURE 3 is an enlarged fragmentary sectional view of the switch and closure position of the electronic device as shown in FIGURE 2.
FIGURE 4 is a side elevational view of a closure member illustrated in FIGURES 1 through 3.

Referring to the figures, the electronic device has a carrying case 10 which is generally rectangular in section and is made of jointed sections of a suitable material permeable by radio waves, such as leather. The case has a flap 14 which overlaps partially the front wall 16 of the case. This flap is secured to the top of the rear wall 18 of the case and has a crease 19 confronting the front wall 16 so that when the flap is opened fully, an otherwise enclosed pocket or compartment 20 is exposed for the insertion or removal of an electronic device.

Within pocket 20 there is fitted an electronic device which may be a remote control transmitter assembly 22 for actuating a motor driven control for a garage door. The transmitter assembly is mounted on a printed circuit board 24 or the like and may include whatever electronic components are required, such as semi-conductive devices 26 and 28 and the coil 30. Also, batteries 31 are mounted on the circuit board 24 to supply power for operation of the electronic unit. Such devices and coils are shown only as an example of the various devices which may be mounted on board 24 to effect the circuit function required. A rectangular box or housing 32 of paper or other electrically insulating material encloses the assembly 22 and is secured thereto to protect the components from physical damage against contiguous surfaces of the case and to assure proper electrical insulation.

The board 24 has mounted thereto a control switch 40 which is used to initiate and terminate the transmission of signals from the unit. This switch 40 is a conventional push button switch and has a threaded outer body portion 42 about which suitable locking nuts 44 are threadedly disposed to secure the switch on the mounting board through a suitably sized opening 46 in the board. As is conventional, the lock nuts are tightened on opposite sides of the mounting board 24 to fasten the switch to the board. Other mechanisms may also be used for fastening the switch 40 permanently to the board 24.

The switch 40 includes a tubular bushing 50 externally threaded which extends through a circular end portion 52 of a slot 53 in the front wall of the carrying case. The slot 53 extends from the top of the front wall 16 of the case 10 parallel to the edges thereof and has a width greater than the diameter of the lock nut 44 positioned adjacent to the front wall 16. The tubular bushing 50 of the switch 40 has a smaller diameter than the adjacent lock nut 44, or the body portion 42 of the switch, and the bushing extends outwardly through the circular portion 52 of the slot 53. A rod-shaped actuator member or button 54 is slidably disposed within the bore of the tubular bushing 50 of the switch 40, and the switch is closed when the actuator button 54 is depressed. The actuator button 54 is spring biased outwardly, as is conventional, so that the switch 40 is normally in an open position.

As mentioned previously, a number of functions are necessary for the structure set forth above. For example, care must be taken to insure that the activating button is not depressed inadvertently. Also, the position of the mounting board must be fixed with respect to the casing and further there is the necessity of maintaining the front flap closed. Additionally, it is necessary that the case 10 protect the electronic unit within the case from the deleterious effect of dirt and particles which may sift through the case into the compartment containing the electronic unit. Also, the case must be constructed in such a manner as to facilitate removal and insertion of the electronic unit, both for purposes of assembly at minimum cost and for purposes of battery replacement and service. These functions are all accomplished in the present invention by the use of a single closure member 60. This closure member has a tubular body 61 and enlarged tubular headed portion 62. The tubular body 61 is internally threaded, as indicated by the reference character 63, to mate with the external threads of bushing 50. The tubular body 61 of the closure member 60 has a cylindrical exterior wall 64 which fits through a circular clearance opening 66 in the flap 14. The opening 66 has a diameter only slightly greater than the diameter of the tubular body 61 and thereby serves to position the switch and the mounting board to which it is fastened relative to the flap 14. The outer or head end 62 of the closure member 60 has a flat shoulder 68 perpendicular and adjacent to the tubular body external wall 64. This shoulder 68 is of greater diameter than that of the adjacent flap opening 66 and is greater in diameter than the front wall opening 52, so that on tightening of the closure member on bushing 50, the head end 62 draws the mounting board 24 toward the shoulder 68 and the flap 14 and wedges the front wall between the mounting board 24 and flap 14, 16 in a locked relationship. To facilitate tightening of the closure member, the outer cylindrical wall 70 of the headed portion 62 is knurled.

It is to be noted that the circular portion 52 of the slot 53 has a diameter substantially greater than the diameter of the lock nut 44 which it contains, so that the switch 40 may be positioned over a relatively wide area within the circular portion 52 of the slot 53. Further, the circular portion 52 of the slot 53 is substantially larger in diameter than the tubular body 61 of the closure member 60. As a result, the closure member 60 extends into the circular portion 52 of the slot 53 when in full engaged position. As a result of this construction, the electronic unit 22 may be adjusted in position within the compartment 20 within the confines of the space provided by the circular portion 52 of the slot 53, and the unit 22 will be restrained from further motion when the closure member 60 is fully tightened against the flap 14. In general, it is desirable to have an electronic unit 22 of sufficiently small dimensions to permit movement of the electronic unit 22 within the compartment 20 in order to adjust the position of the flap 14 to the tightest closure position before locking the flap 14 in position with the closure member 60.

Within tubular head portion 62 there is provided a recess 72 communicating with the tubular threaded bore 63 and it is within this recess that the push button 54 is disposed. This recess 72 is sufficiently large to allow a finger to be inserted therein to depress button 54 as required. The knurled peripheral wall 70 extends away from the flap a distance greater than the maximum extended height of the push button 54 when the button is in its most fully extended position. Consequently, the button is protected from random or inadvertent depression in a manner allowing a finger to be inserted to depress the button.

To assemble the complete device, flap 14, opened and the assembly 22 is inserted in pocket 20 with switch 40 facing front wall 16. The tubular portion 50 and the adjacent lock nut 44 are translated through the linear portion of the slot 53 to the circular portion 52 thereof. The flap 14 is then closed and closure member 60 is aligned with threaded bore 63 adjacent to the bushing 50. The knurled wall 70 is gripped manually and the member 60 is tightened onto the threaded bushing 50. Shoulder 68 remains outward of the opening 66 of flap 14 so that the flap 14 is locked shut and in addition, as mentioned, the mounting board is held tightly mounted on front wall 16.

To remove the assembly, when, for example, the batteries 31 powering the device must be replaced or the device is to be serviced, the closure member is grasped along the knurled peripheral wall 70 and the closure member is loosened. When the engagement of bore 63 with the bushing 50 is released, the closure member is removed and flap 14 may be opened. The assembly is then translated from the compartment 20 with bushing 50 traversing the length of the slot 53.

While there has been described what is at present thought to be a preferred embodiment of the present invention, it will be understod that modification may be made therein and it is intended to cover in the appended claims all such modifications as fall within the scope of the present invention.

The invention claimed is:

1. A carrying case construction for housing a small portable electronic device of the type in which said device is mounted on a mounting panel from which there extends a device operating switch with a switch operator designed to be actuated from the exterior of said carrying case and in which said carrying case has an openable flap allowing access to said device when the flap is opened: the invention comprising an opening in said carrying case and an opening in said flap alignable with said carrying case opening; a closure member comprising means extending through both said aligned openings, a threaded bore in said extending means mating with a threaded exterior bushing on said switch to hold said switch interiorly of said case and adjacent said case opening to thereby position said switch and the device mounting panel adjacent said case opening, an enlarged head on said closure member disposed outwardly of said flap to hold said flap against said case in the closed position, an open bore in said head circularly surrounding said switch operator to prevent said operator from being struck inadvertently, and manual grasping structure on the exterior of said head to allow said closure member to be removed to open said flap.

2. A carrying case construction for a small portable electronic device of the type in which said device is mounted on a mounting panel from which there extends a device operating switch adapted to be actuated from the exterior of the carrying case, the invention comprising: a flap being hinged to said carrying case, said flap being openable to allow access to the interior of the case, an opening in the case for receiving said switch, an opening in said flap alignable with the opening in said case for receiving said switch for actuation from the case exterior, a locking member including a threaded bore mating with a threaded bushing on the exterior of said switch for locking said member to said switch whereby to position said switch and its mounting panel with respect to the carrying case and flap openings, an enlarged head on said member with a shoulder greater in area than said flap opening to hold said flap tightly against said case on locking of said member to said switch, and a wall on said enlarged head extending away from said case a distance greater than the length of said switch operator in its most extended position whereby to protect said switch operator from inadvertent actuation.

3. A carrying case construction for housing a small portable electronic device of the type in which said device is mounted on a mounting panel from which there extends a switch mechanism for actuating the device, in which the switch has a switch actuating arm adapted to be actuated manually from the exterior of the case, and in which there is a pocket in said case for holding said device in a manner allowing removal of the device therefrom, the invention comprising: a flap covering the pocket of the case to enclose the device within the case, an opening in said case for receiving said switch actuating arm, an opening in said flap alignable with the opening in said case to position said switch actuating arm in said aligned openings for actuation from the case exterior, a tubular member mating with the switch mechanism to lock said switch mechanism to said case adjacent said case opening, an open bore in said member encircling said switch actuating arm allowing manual actuation thereof, said member extending outwardly of said case a distance greater than the furthest extent of said switch actuating arm to protect said arm from inadvertent actuation, and an enlarged head on said member adjacent said flap to hold said flap tightly against said case on the mating of said member to said switch mechanism.

4. A portable electronic device comprising, in combination: an electronic unit having a plurality of components mounted on one side of a mounting panel including an electrical switch, said switch having a cylindrical bushing provided with an axial channel extending from said side of the mounting panel through an aperture in said panel and protruding from the other side of said panel, said switch including an actuator button translatably disposed within the channel of the bushing, the actuator button being spring biased outwardly and effective to close said switch when translated inwardly; and a case having an opening at one end and a compartment therein adapted to contain the electronic unit, said case having a front wall extending from the opening thereof and a back wall extending from said opening thereof, the front wall having a slot extending therein from the opening of sufficient width to accommodate the bushing of the switch of the electronic unit, said slot terminating at its end opposite the opening in an enlarged circular portion loosely accommodating the bushing of the switch, a flap mounted on the back wall of the case and extending over the opening and having a crease confronting the front wall of the case, said flap extending adjacent to the front wall of the case and having an orifice aligned with the circular portion of the slot in the front wall of the case; and a closure member having a body with a first cylindrical portion and a second cylindrical portion coaxial therewith, the first cylindrical portion having a diameter slightly smaller than the diameter of the orifice of the flap and the second cylindrical portion having a diameter greater than the diameter of the first cylindrical portion, said closure member having an axial bore extending therethrough provided with threads adapted to engage the threads of the bushing, said closure member having a recess extending therein from the side thereof opposite the first cylindrical portion, said first cylindrical portion extending through the orifice in the flap and into the circular portion of the slot, and the second cylindrical portion wedging the flap and front wall of the case against the panel of the electronic unit, and the second cylindrical portion having an axial length greater than the distance the translatable button extends from the flap.

No references cited.

KATHLEEN H. CLAFFY, *Primary Examiner.*